US006470851B1

(12) United States Patent
DeGroot et al.

(10) Patent No.: US 6,470,851 B1
(45) Date of Patent: Oct. 29, 2002

(54) METHOD AND APPARATUS OF CONTROLLING THE ACTUATION OF A COMPRESSION BRAKE

(75) Inventors: Jeffrey L. DeGroot, Metamora; Hans P. Dietz, Naperville; Thomas A. McCauley, Brimfield; Angela I. Tan, Peoria, all of IL (US)

(73) Assignee: Caterpillar Inc, Peoria, IL (US)

( * ) Notice: Subject to any disclaimer, the term of this patent is extended or adjusted under 35 U.S.C. 154(b) by 27 days.

(21) Appl. No.: 09/699,699

(22) Filed: Oct. 30, 2000

(51) Int. Cl.[7] .......................... F02D 13/04; B60K 31/00

(52) U.S. Cl. ................ 123/323; 123/352; 123/198 DB; 180/179

(58) Field of Search ................................ 123/320, 321, 123/322, 323, 350, 352, 325, 332, 482, 483, 481, 198 DB, 198 F; 180/179

(56) References Cited

U.S. PATENT DOCUMENTS

| | | | | | |
|---|---|---|---|---|---|
| 4,387,681 | A | * | 6/1983 | Ikeura et al. | 123/325 |
| 4,391,243 | A | * | 7/1983 | Bessho | 123/325 |
| 4,572,114 | A | | 2/1986 | Sickler | |
| 4,688,384 | A | | 8/1987 | Pearman et al. | |
| 4,706,624 | A | | 11/1987 | Meistrick et al. | |
| 4,933,850 | A | * | 6/1990 | Wheeler | 701/56 |
| 5,012,778 | A | | 5/1991 | Pitzi | |
| 5,086,738 | A | | 2/1992 | Kubis et al. | |
| 5,121,723 | A | | 6/1992 | Stepper et al. | |
| 5,255,650 | A | | 10/1993 | Faletti et al. | |
| 5,409,432 | A | * | 4/1995 | Steeby | 701/53 |
| 5,603,300 | A | | 2/1997 | Feucht et al. | |
| 5,619,964 | A | | 4/1997 | Feucht | |
| 5,634,446 | A | | 6/1997 | Rauznitz et al. | |
| 5,733,219 | A | * | 3/1998 | Rettig et al. | 123/322 |
| 5,781,199 | A | * | 7/1998 | Oniki et al. | 345/505 |
| 5,983,149 | A | | 11/1999 | Tate et al. | |
| 6,161,524 | A | * | 12/2000 | Akbarian et al. | 701/102 |

FOREIGN PATENT DOCUMENTS

| | | | | |
|---|---|---|---|---|
| EP | 0638 455 A1 | * | 8/1994 | B60K/41/06 |
| JP | 58-032941 | * | 2/1983 | F02D/29/02 |
| JP | 62-210249 | * | 9/1987 | F02M/7/12 |

* cited by examiner

*Primary Examiner*—John Kwon
*Assistant Examiner*—Hieu T. Vo
(74) *Attorney, Agent, or Firm*—W Bryan McPherson, III

(57) ABSTRACT

A method and apparatus for controlling the speed of an engine having a plurality of cylinders and a compression brake operable on one or more of the cylinders is disclosed. The method includes determining a speed of the engine, comparing the engine speed to a first threshold, and activating the compression brake for at least one of the cylinders in response to the engine speed exceeding the first threshold.

11 Claims, 6 Drawing Sheets

METHOD AND APPARATUS OF CONTROLLING THE ACTUATION OF A COMPRESSION BRAKE

TECHNICAL FIELD

The present invention relates generally to engine compression release brakes, and more particularly, to a method and apparatus of controlling the actuation of a compression brake.

BACKGROUND ART

Engine retarding devices of the compression release type may be utilized in machines such as on-highway trucks and the like. A compression release brake assembly utilizes compression within the machine's engine to assist the machine's main braking system in order to slow the machine. In effect, such compression release brake assemblies convert the machine's internal combustion engine into an air compressor in order to develop retarding horsepower which is utilized to assist in slowing the machine.

Machine engines, such as truck engines, have physical speed limitations, which if exceeded, may cause the engine to fail. For example, if an engine, exceeds a particular speed, e.g., 2200 revolutions per minute, then the engine may fail. The particular speed which an engine may fail may vary from one engine to another, and from one engine size to another. The engine may fail, for example, because the crankshaft and therefore the associated camshafts are rotating so rapidly, leading to the opening and closing of the intake and exhaust valves occurring more rapidly and with increased force such that damage to the valves may occur, which may lead to additional damage to the cylinder and/or piston. In addition, piston lubrication begins to break down much quicker at high engine speeds, especially if the engine speed is maintained for a noticeable amount of time, thereby causing damage to the cylinder and/or piston.

Therefore, when a machine begins to travel downhill, for example, the engine speed may increase, even without an increase in throttle position. If the speed increases to much engine damage may occur. In addition, if the engine is downshifted, the engine speed may suddenly increase from an acceptable value in the previous gear, to an unacceptable value in the downshifted gear, causing engine damage to occur.

Some systems, such as that disclosed in U.S. Pat. No. 5,634,446, utilize a compression brake, or auxiliary brake, to maintain the speed of a vehicle during activation of a cruise control system. That is, when the cruise control system is engaged, the system monitors the speed and/or acceleration of the vehicle, and engages the auxiliary brake if necessary to maintain a desired vehicle speed. However these systems are inadequate to prevent engine overspeed conditions that may lead to failure. There may not inherently be a direct correlation between vehicle speed and engine speed. For example, in some situations, such as traveling downhill, engine speed may increase significantly without a corresponding increase in vehicle speed. Monitoring vehicle speed would not provide the necessary information to determine if the engine speed was above a desired speed. If the speed increases to much engine damage may occur. In addition, if the engine is downshifted, the engine speed may suddenly increase to an unacceptable value in the downshifted gear. The downshift may cause an unacceptable engine speed in the downshifted gear, without any change in vehicle speed.

The present invention is directed to overcoming one or more of the problems identified above.

DISCLOSURE OF THE INVENTION

In one aspect of the present invention, a method of controlling the speed of an engine is disclosed. The engine includes a plurality of cylinders, and a compression brake operable on one or more of the cylinders. The method includes the steps of determining a speed of the engine, comparing the engine speed to a first threshold, and activating the compression brake for at least one of said cylinders in response to the engine speed exceeding the first threshold.

In another aspect of the present invention, an apparatus configured to control the speed of an engine is disclosed. The engine includes a plurality of cylinders, and the apparatus includes a compression brake operable one or more of the cylinders of the engine. The apparatus comprises a speed sensor adapted to sense an engine characteristic indicative of an engine speed and responsively generate an engine speed signal, and a controller configured to receive said engine speed signal, compare the engine speed to a first threshold, and activate the compression brake for at least one of the cylinders in response said engine speed exceeding the first threshold.

BEST MODE FOR CARRYING OUT THE INVENTION

Figure 1:
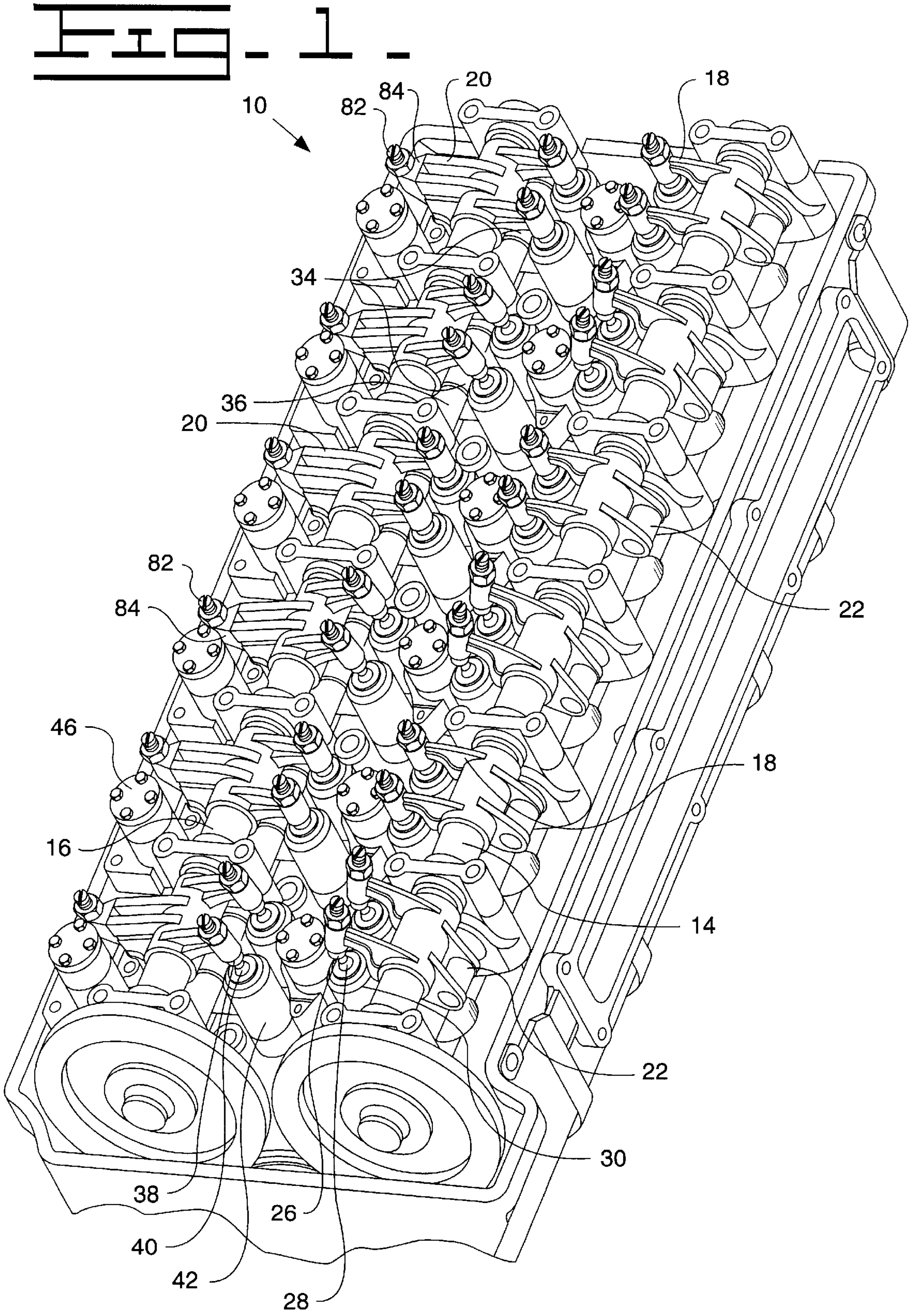
FIG. 1 is an internal combustion engine which incorporates the features of the present invention therein.
Figure 2:
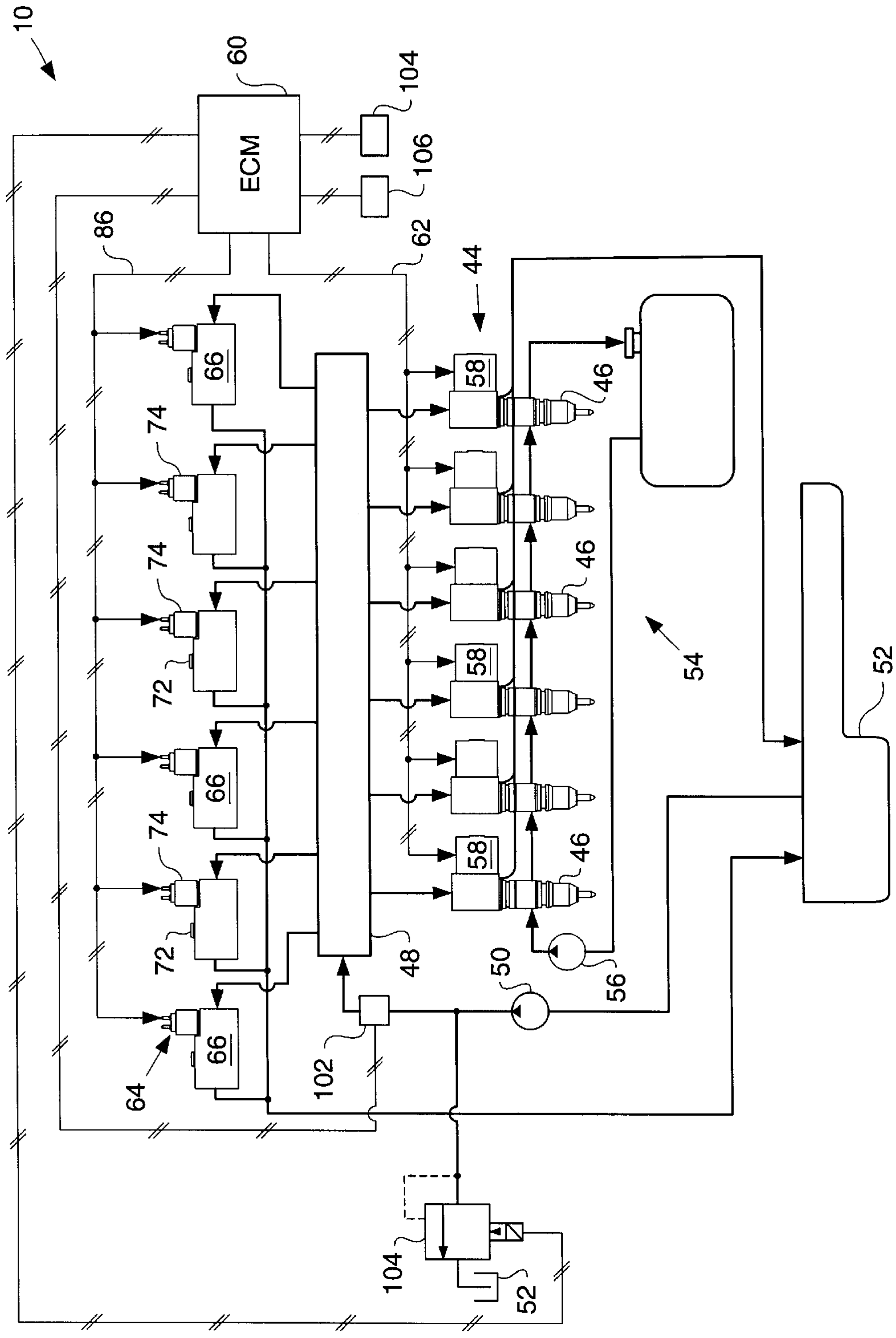
FIG. 2 is a schematic view of the internal combustion engine of FIG. 1.

The present invention provides a method and apparatus of controlling the speed of an engine having a compression brake. FIGS. 1 and 2, illustrate one embodiment of an internal combustion engine such as a diesel engine 10. The engine 10 is shown in the drawings, and will be described herein, as a six-cylinder diesel engine; however, it should be appreciated that the engine 10 of the present of invention could be embodied as any type of internal combustion engine with any number of cylinders.

The engine 10 includes an engine block and head assembly 12 having a pair of rocker arm shafts 14, 16 secured thereto. The rocker arm shaft 14 has a number of intake rocker arms 18 rotatably secured thereto, whereas the rocker arm shaft 16 has a number of exhaust rocker arms 20 rotatably secured thereto. Each of the intake rocker arms 18 has a roller 22 coupled thereto which is selectively contacted by a number of cam lobes (not shown) associated with an intake cam shaft. In particular, rotation of the intake cam shaft causes the cam lobes associated therewith to be selectively moved into and out of contact with the rollers 22 of each of the intake rocker arms 18. Contact with one of the intake rocker arms 18 by the cam lobes causes the intake rocker arm 18 to pivot or otherwise rotate about the rocker arm shaft 14 thereby causing a valve contact rod 26 associated with the intake rocker arm 18 to contact an upper portion of a valve stem 28 of an intake valve 30. Such contact with the upper portion of the valve stem 28 urges the intake valve 30 downwardly thereby opening the intake valve 30 so as to allow air to flow into the associated engine cylinder in a known manner.

Similarly, each of the exhaust rocker arms 20 has a roller 32 (see FIG. 4) coupled thereto which is selectively contacted by a number of cam lobes 34 associated with an exhaust cam shaft 36. In particular, rotation of the exhaust cam shaft 36 causes the cam lobes 34 to be selectively moved into and out of contact with the rollers 32 of each of the exhaust rocker arms 20. Contact with one of the exhaust rocker arms 20 by the cam lobes 34 causes the exhaust rocker arm 20 to pivot or otherwise rotate about the rocker arm shaft 16 thereby causing a valve contact rod 38 associated with the exhaust rocker arm 20 to contact an upper portion of a valve stem 40 of an exhaust valve 42. Such contact with the upper portion of the valve stem 40 urges the exhaust valve 42 downwardly thereby opening the exhaust valve 42 so as to allow gas within the associated engine cylinder to flow from the cylinder.

The engine 10 may also include a hydraulically-powered fuel injection system 44, as illustrated in FIG. 2. The fuel injection system 44 includes a number of fuel injectors 46 which are provided to selectively inject fuel into an associated engine cylinder. The hydraulically-powered fuel injection system 44 of the present invention may be provided as any known hydraulically-powered fuel injection system. In addition, a fuel pump and associated digitally controlled fuel valves may be utilized to inject fuel into a cylinder.

The hydraulic pump 50 is generally driven by the engine 10 and is provided to pump hydraulic fluid from a reservoir or sump 52 to the fluid manifold 48. Each of the fuel injectors 46 is fluidly coupled to the fluid manifold 48 such that fluid pressure from the manifold 48 may be utilized to generate a relatively high fuel pressure from the fuel within the fuel injectors 46. In particular, the engine 10 further includes a fuel system 54 which has a fuel pump 56 for pumping fuel to each of the fuel injectors 46. In one embodiment, the fuel within the fuel injectors 46 is pressurized via a plunger assembly (not shown) which is driven by the fluid pressure from the fluid manifold 48.

In one embodiment, as illustrated in FIG. 2, the engine 10 may include an Injector Actuation Pressure Control Valve (IAPCV) 104. In the preferred embodiment, the IAPCV 104 and the hydraulic pump 50 enable the controller 60 to maintain the desired pressure of the actuating fluid. For example, in one embodiment, a pressure sensor 102 senses the actual pressure of the actuating fluid and responsively delivers a fluid pressure signal to the controller 60. The controller 60 compares the actual fluid pressure and the desired fluid pressure and responsively delivers a command signal to the IAPCV 104 to achieve the desired fluid pressure. In one embodiment, the pump 50 is a variable displacement pump, and may be used to control the pressure of the actuating fluid. The controller 60 compares the actual fluid pressure and the desired fluid pressure and responsively delivers a command signal to the variable displacement pump 50 to achieve the desired fluid pressure.

Each of the fuel injectors 46 includes a high-speed, solenoid-actuated hydraulic valve 58 which is electrically coupled to an engine control module 60, or controller, via a wiring harness 62. In such a manner, the engine control module 60 may selectively generate injection pulses which are sent to the individual solenoid-actuated hydraulic valves 58 so as to open the valve 58 thereby increasing the fluid pressure exerted on the plunger assembly of the associated fuel injector 46 which in turn increases the fuel pressure within the injector 46. Such an increase in the fuel pressure within the fuel injector 46 causes fuel to be injected into the engine cylinder associated with the particular fuel injector 46. It should be appreciated that the engine control module 60 may operate the fuel injectors 46 in wide variety of manners in order to generate injection sequences and operation characteristics which fit the needs of a given engine 10.

Figure 3:
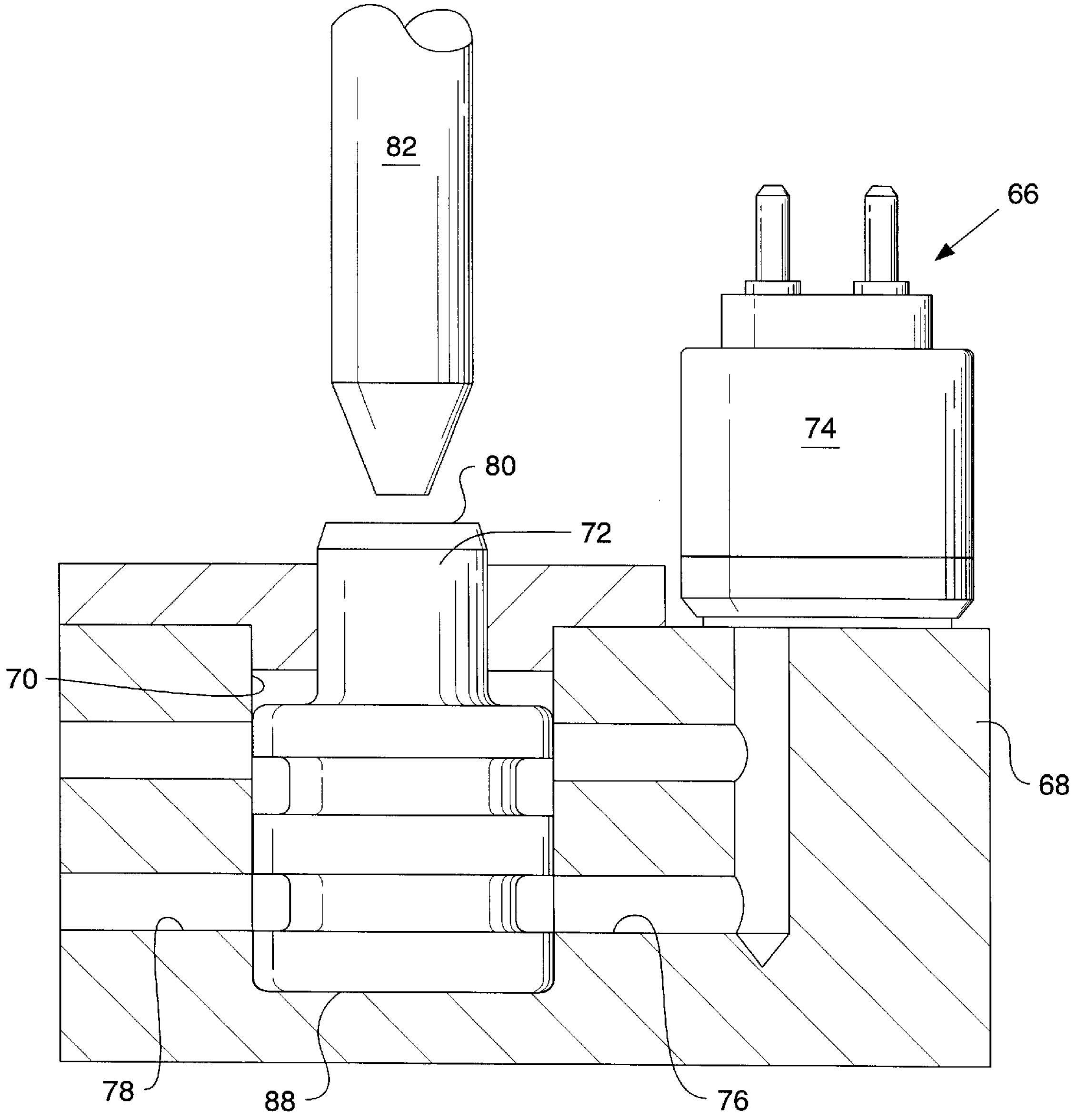
FIG. 3 is a cross sectional view of the actuator assembly of the compression release brake assembly of the internal combustion engine of FIG. 1, note that the solenoid-controlled hydraulic valve is not shown in cross section for clarity of description.

The present invention, as will be discussed, is not dependent on a particular type of compression braking assembly, or auxiliary brake. However, the following description is an example of one embodiment of a compression brake assembly that may be utilized in conjunction with the present invention. The engine 10 may include a hydraulically-powered compression release brake assembly 64. The compression release brake assembly 64 includes a number of actuator assemblies 66 (see also FIG. 3) which are provided to selectively open the exhaust valves 42 associated with the engine 10 when the engine 10 is being operated in a compression braking operation. Each of the actuator assemblies 66 includes a housing 68 having a fluid chamber 70 defined therein for housing a piston 72. Each of the actuator assemblies 66 also includes a high-speed, solenoid-actuated hydraulic valve 74. The solenoid-actuated hydraulic valves 74 are similar to the solenoid-actuated hydraulic valves 58. For example, one high-speed, solenoid-actuated hydraulic valve which may be utilized as the solenoid-actuated hydraulic valves 74 of the present invention are the solenoid-actuated hydraulic valves which are utilized to actuate the fuel injectors of the fuel injection system. It is understood that other embodiments of compression brakes may be used that are capable of engaging one or more of the cylinders in a braking mode.

The housing 68 of the actuator assembly 66 has a number of input fluid passages 76 and drain fluid passages 78 defined therein. The solenoid-actuated hydraulic valve 74 selectively couples the input fluid passages 76 to the fluid manifold 48. In particular, when the solenoid-actuated hydraulic valve 74 is positioned in an open position, pressurized hydraulic fluid is advanced from the fluid manifold 48, into an input port associated with the valve 74, out an output port associated with the valve 74, and into the input fluid passages 76 and hence the fluid chamber 70. The presence of pressurized hydraulic fluid in the fluid chamber 70 causes the piston 72 to be urged upwardly (as viewed in FIG. 3) and into an extended position in which a contact side 80 of the piston 72 is urged into contact with a portion of the exhaust rocker arm 20.

Figure 4:
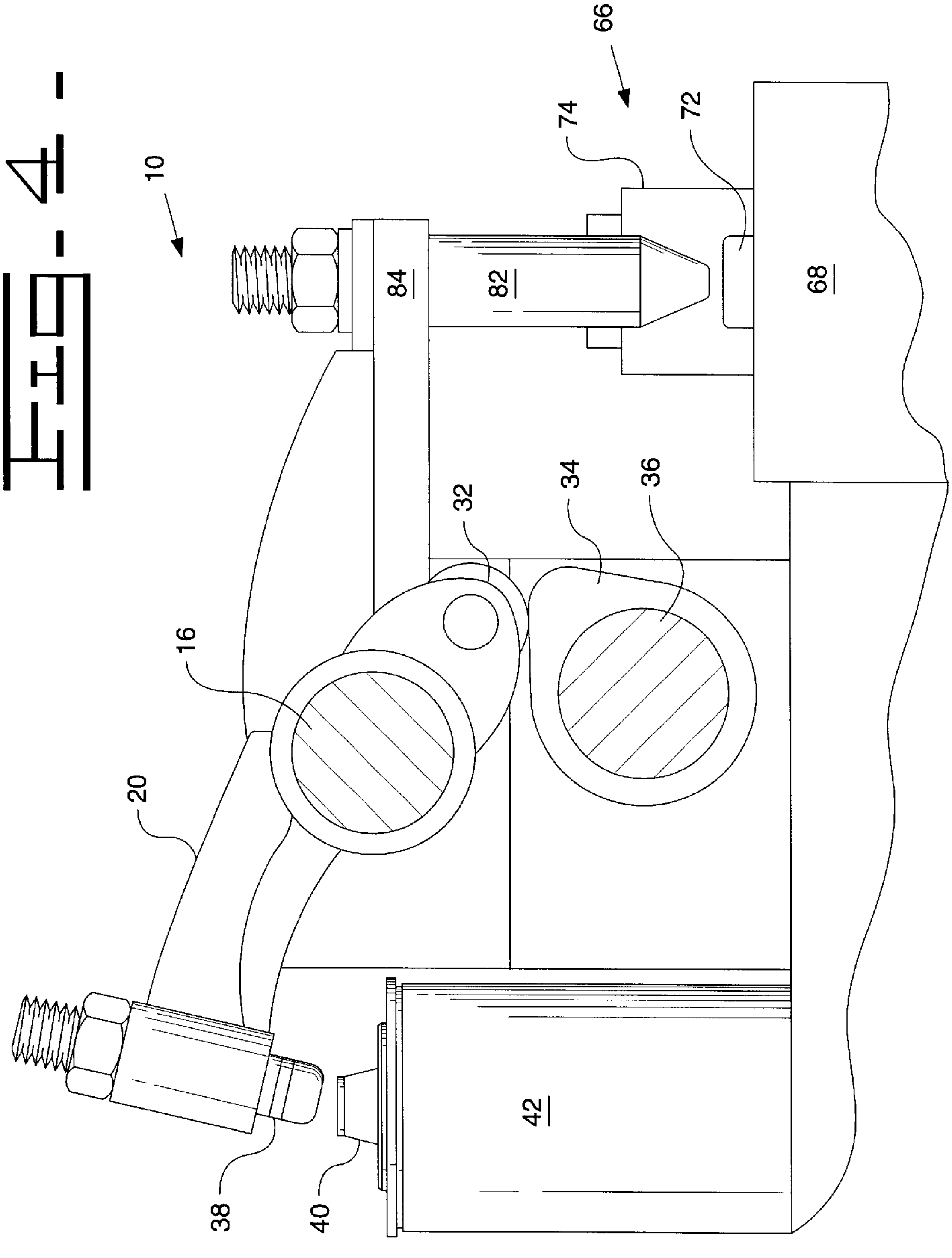
FIG. 4 is a side elevational view which shows the actuator assembly of the compression release brake assembly of FIG. 3 being utilized in the design of an overhead cam engine.

In particular, as shown in FIG. 4, a contact rod 82 is secured to an extension member 84 of each of the exhaust rocker arms 20. When the contact rod 82 is contacted by the piston 72, the contact rod 82 is urged upwardly (as viewed in FIG. 4) so as to urge the extension member 84 of the exhaust rocker arm 84 upwardly. Movement of the extension member 84 in an upward direction (as viewed in FIGS. 3 and 4) causes the exhaust rocker arm 20 to pivot or otherwise rotate about the rocker arm shaft 16 thereby causing the valve contact rod 38 associated with the exhaust rocker arm 20 to contact the upper portion of a valve stem 40 of the exhaust valve 42. Such contact with the upper portion of the valve stem 40 urges the exhaust valve 42 downwardly thereby opening the exhaust valve 42 so as to allow gas within the associated engine cylinder to flow from the cylinder. The speed sensor 106 enables the engine timing, e.g., piston position, to be monitored and determined.

It should be appreciated that operation of the actuator assemblies 66 is under the control of the engine control module 60. In particular, each of the solenoid-actuated hydraulic valves 74 is coupled to the engine control module 60 via a wiring harness 86. In such a manner, the engine control module 60 may selectively generate pulses which are sent to the individual solenoid-actuated hydraulic valves 74 so as to open the valve 74 thereby causing pressurized hydraulic fluid to be advanced from the fluid manifold 48 to a fluid side 88 of the piston 72 so as to urge the piston 72 upwardly (as viewed in FIG. 3). Such upward movement of the piston 72 causes rotation of the exhaust rocker arm 20 and hence opening of the exhaust valve 42 thereby allowing gas to be advanced out the associated engine cylinder. Once the exhaust valve has been opened for a period of time, the engine control module 60 ceases to generate a pulse on the wiring harness 86 thereby causing the particular exhaust valve 42 to be closed.

As shown in FIG. 4, there is a gap of a predetermined distance between the contact side 80 of the piston 72 and the lower surface of the contact rod 82 in order to prevent the exhaust valve 84 from being inadvertently held open during operation of the engine 10 which could potentially reduce the useful life of the exhaust valve 42.

The engine 10 also includes a speed sensor 106. The speed sensor 106 is adapted to sense a characteristic of the engine 10 that is indicative of engine speed and responsively deliver a speed signal to the controller 60. For example, in operation, the crankshaft (not shown) of the engine 10 rotates when the engine 10 is being operated. The rotation of the crankshaft results in the piston(s) of the engine moving between a top dead center position and a bottom dead center position. In one embodiment, the speed sensor 106 monitors the rotational position of the crankshaft and sends an associated signal to the controller 60. A particular piston position may be determined by correlating a piston position with the sensed crank angle position. Therefore, by monitoring the crank angle position, the piston position may be determined. The speed sensor 106 may be a crankshaft sensor that is disposed adjacent to the crankshaft flywheel (not shown). The sensor monitors the rotational position of the engine crankshaft and responsively produces a crankshaft pulse-train. The crankshaft sensor may be an optical or magnetic type sensor. In addition, two speed sensors 106 may be utilized for redundancy purposes. In one embodiment, the speed sensor 106 may be used to monitor the speed of a gear having a special tooth pattern. The monitoring of the special pattern enhancing the accuracy of engine speed determinations.

It should also be appreciated that the engine control module 60 controls operation of the fuel injectors 46 and the brake actuator assemblies 66 in order to control output from the engine 10. In particular, the engine 10 is operable in either a drive mode of operation or a brake mode of operation. When the engine 10 is being operated in its drive mode of operation, the engine control module 60 controls the fuel injectors 46 such that fuel is injected into the engine cylinders so as to cause combustion within the engine cylinders in order to produce positive mechanical output from the engine 10 thereby driving the drive train (not shown) of a work machine such as an on-highway truck. It should be noted that when the engine 10 is being operated in its drive mode of operation, the intake valves 30 and the exhaust valves 42 are operated in a known manner (i.e. selectively opened and closed) by the camshafts 24, 36, respectively, such that the intake valves 30 are opened during the intake stroke of the engine 10, whereas the exhaust valves 42 are opened during the exhaust stroke of the engine 10.

In an alternative embodiment, the intake valve and the exhaust valve may be electronically controlled. For example, the intake and exhaust valve may be controlled independent of each other, the fuel injection occurrences, and of the rotation of the camshaft. The exception being that the operation of the intake and exhaust valve will maintain a general relationship to the piston position, in that the piston position, or cylinder cycle, may be used to determine the desired timing of valve operation.

When the engine 10 is operated in its drive mode of operation, the compression release brake assembly 64 is usually idled. In particular, during operation of the engine 10 in its drive mode of operation, the engine control module does not open any of the solenoid-controlled hydraulic valves 74 associated with actuator assemblies 66 thereby isolating the fluid chamber 70 from the fluid manifold 48. Such isolation of the fluid chamber 70 from the fluid manifold 48 positions the piston 72 in its retracted position thereby preventing it from contacting the contact rod 82.

Conversely, when the engine 10 is being operated in its brake mode of operation, the engine control module 60 controls the actuator assemblies 66 of the compression release brake assembly 64 such that the exhaust valves 42 are selectively opened in order to release compressed gas within the engine cylinders. In particular, the engine control module 60 may generate an output pulse which opens the solenoid-controlled valve 74 of a particular actuator assembly 66 thereby causing the piston 72 to urge the contact rod 82 upwardly which in turn opens the exhaust valve 42 in the manner described above.

Moreover, when the engine 10 is operated in its brake mode of operation, the fuel injection assembly 44 is preferably idled. In particular, during operation of the engine 10 in its brake mode of operation, the engine control module 60 preferably does not open any of the solenoid-controlled hydraulic valves 58 associated with the fuel injectors 46 thereby preventing fuel from being injected into the corresponding engine cylinders.

In one embodiment of the present invention, the controller 60 determines a speed of the engine, compares the speed with a first speed threshold, disables fuel injection to each cylinder in response to the engine speed exceeding the first threshold and activates the compression brake for at least one cylinder in response to the engine speed exceeding the first threshold.

Figure 5:
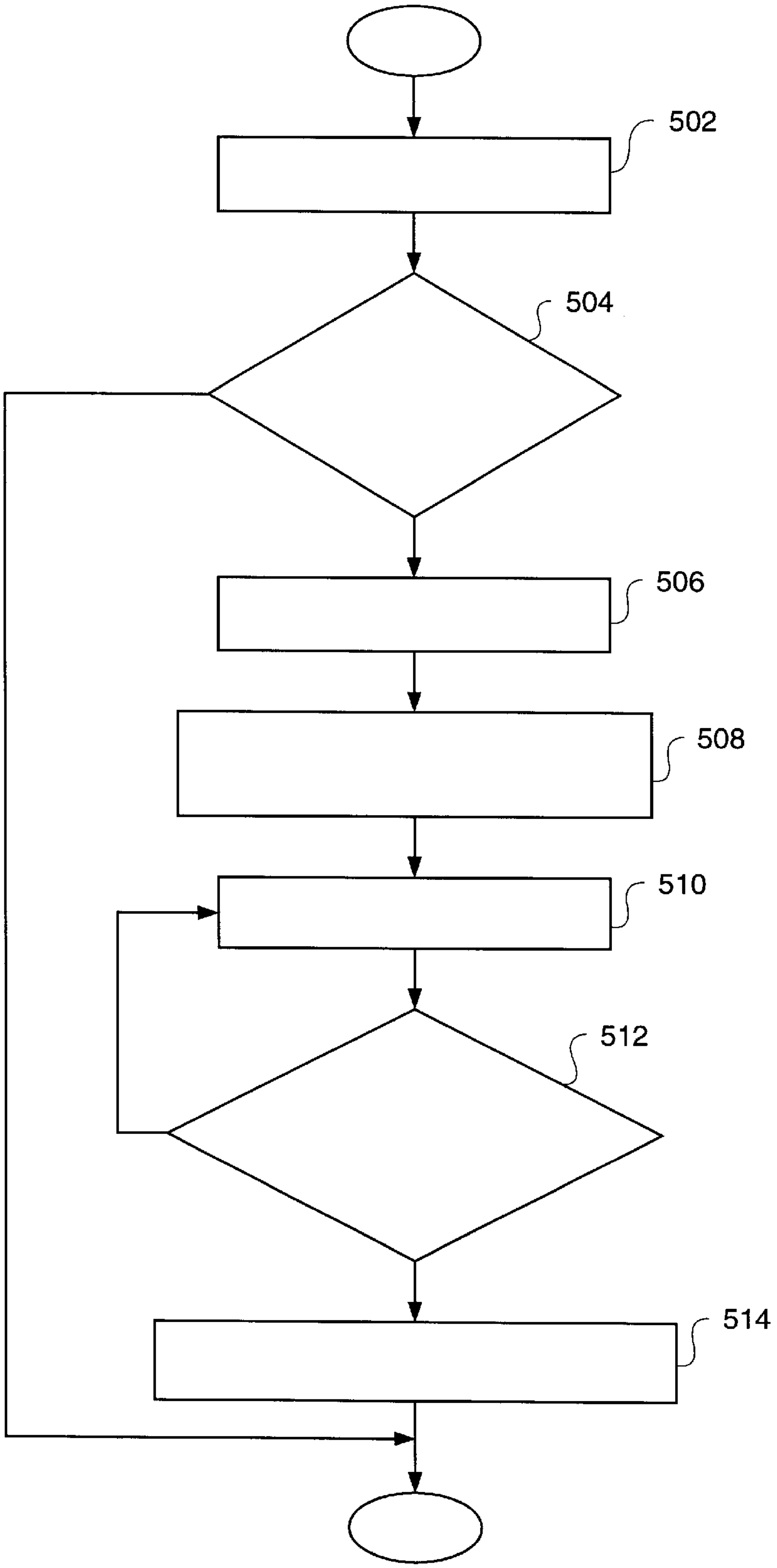
FIG. 5 illustrates a flow chart of one embodiment of the present invention.

FIG. 5 illustrates one embodiment of a method of the present invention. In a first control block 502, an engine speed is determined. For example, the controller may receive a signal from the speed sensor 106 indicative of engine speed, and responsively determine a speed of the engine. In a first decision block 504, the engine speed is compared to a first speed threshold. The first speed threshold may be established to be a speed, above which there is a large risk of the engine failing. For example, if the engine speed exceeds the first speed threshold, an engine overspeed condition may be determined to exist, or likely to exist. That is, the engine speed is larger than desired and may result in damage to the engine. The first speed threshold is implementation dependent, and is dependent in part on the type of engine being used. For example, in one embodiment, the threshold may be established to be 2300 revolutions per minute (rpm) for a fifteen liter engine. If the engine speed does not exceed the threshold, then control passes to the end of the method. However, if the engine speed does exceed the first threshold, then control passes to a second control block 506.

In the second control block 506, fuel injection into each of the cylinders is disabled. Therefore, there are no combustion events in any of the cylinders. Control then passes to a third control block 508. In the third control block 508, the compression brake to at least one of the cylinders is activated, or engaged. While the compression brake may be activated for one or more cylinders, in the preferred embodiment, the compression brake is activated for all of the cylinders, thereby obtaining the maximum braking capability of the compression brake.

As described previously, compression brake actuation may occur by selectively delivering a command pulse from the controller 60 to the individual solenoid-actuated hydraulic valves 74 associated with the cylinders that are desired to be used for compression braking, at the appropriate time. The generation of the pulses for the valves of the desired cylinders results in compression braking for the desired cylinders.

Once the compression brake is activated the engine speed is monitored to determine when the brake may be deactivated. Therefore, control passes to a fourth control block 510 to determine a second engine speed. In a second decision block 512 the second engine speed is compared with a second speed threshold. The second speed threshold is also implementation and engine dependent. In the preferred embodiment, the second speed threshold is less than the first speed threshold, e.g., 1900 rpm. By having the second threshold less than the first threshold, engine instability may be avoided. That is, if the engine speed fluctuates repeatedly over and then under a single threshold, the system is constantly engaging and disengaging the compression brake and fuel injection system which may create an undesired period of engine instability. Accordingly, if the second engine speed is less than the second threshold, control passes to a fifth control block 514 where the compression brake is deactivated, or disengaged, the fuel system is engaged, normal operation of the engine is resumed and control passes to the end of the method. In one embodiment, the compression brake is deactivated for at least one of the cylinders for which it has been activated. In the preferred embodiment, the compression brake is deactivated for any of the cylinders for which it had been activated. In one embodiment, once the compression brake is deactivated, the operator may manually, via a operator braking interface (not shown), re-engage the compression brake for one or more cylinders to control the engine speed if desired.

Referring again to the second decision block 512, if the second engine speed is not less than the second threshold, however, then control returns to the fourth control block 510 and then the engine speed is determined again. This loop is continued until the engine speed drops below the second engine speed threshold.

In one embodiment, a manual activation of the compression brake may be performed in response to an operator initiated command. For example, the operator may activate a braking switch (not shown). The switch may deliver a signal indicative of the desired engine braking to the controller 60. The controller 60 establishes the engine speed and compares it to a manual actuation speed threshold, e.g., 1350 r.p.m. If the engine speed is greater than the manual activation speed threshold then the controller engages compression braking. The manual actuation speed threshold is implementation and speed dependent.

In one embodiment, when the compression brake is manually engaged, the braking continues until the engine speed drops below a second manual speed threshold, or a deactivation threshold. The deativation speed threshold may be implementation and engine dependent. In one embodiment, the deactivation speed threshold is established such that the engine will not stall when the compression braking is disengaged. For example, depending on the engine, if the engine speed drops below 900 rpm, for example, and then the braking mode is disengaged, there is an increased chance the engine may stall when fuel injection to the cylinders resumes. Therefore, the manual activation speed threshold may be established such that there is an adequate range between the manual activation speed threshold and the, deactivation speed threshold. For example, if the engine speed is too low, then it may be inefficient to activate the compression brake because once the compression brake is activated, the speed will rapidly drop below the deactivation speed threshold and the compression brake will be disengaged relatively quickly after being engaged. Therefore, if the engine speed is too low then it will be inefficient to engage the compression brake. In addition, if the engine speed is too low when the compression brake is engaged, and engine speed drops to fast, the speed may drop below the deactivation threshold such that the engine speed has dropped well below the deactivation threshold before the compression brake is effectively disengaged, resulting in an engine speed that is too low and the engine will stall. Again, the deactivation speed threshold is implementation dependent, and may depend on the type or size of the engine involved. Therefore, once the engine speed drops below the deactivation speed threshold, the compression brake is deactivated, and fuel injection to the cylinders resumes.

In one embodiment, the compression braking is disengaged if the engine is operating in a cold mode. One parameter indicative of a cold mode is engine coolant temperature. That is, a coolant sensor (not shown) may be used to sense the temperature of the engine coolant and deliver a temperature signal to the controller 60. If the coolant temperature is not above a cold mode temperature threshold, then the controller 60 will not engage the compression brake, if requested. In one embodiment of a compression brake, actuation of the brake during cold temperatures may damage the components of the engine. For example, the changes in viscosity due to the cold temperatures may cause extreme delays between the command and the actuation of the valves. These delays, if severe enough, may effect valve timing to the point the valves to contact the piston, causing damage to the cylinder and associated elements.

In one embodiment, the operator may designate a desired throttle position during the operation of the vehicle. However, when an engine over-speed condition is detected, the throttle command is ignored while the compression brake is activated. Once the over-speed condition is resolved, i.e., the engine speed is reduced below the second threshold, then the compression brake is disengaged, and the throttle command from the current throttle position is used to control the engine.

In one embodiment, engine acceleration may also be utilized to detect an engine overspeed condition. For example, one check for engine overspeed may be by determining if the engine speed has exceeded a first threshold, e.g., 2200 rpm. A additional check may be if the engine acceleration has exceeded an established rate, e.g., an increase of 400 rpm/second, and the engine speed has exceeded a second threshold, e.g., 2000 rpm, then the engine overspeed condition may be anticipated and the fuel injection disabled to each of the cylinders, and the compression brake engaged for one or more of the cylinders. As indicated, in this embodiment the second threshold (e.g., 2000 rpm) used for the additional check, may be lower than the first threshold (e.g., 2200 rpm), because the desire is to anticipate that the engine speed will exceed the first engine speed threshold, based upon the current acceleration rate of the engine. In an alternative embodiment, the determination for an engine overspeed condition may be made by simply comparing the engine speed with a first engine speed threshold, and comparing the engine acceleration with the desired engine acceleration threshold, and activating the compression brake system for one or more of the cylinders when the engine speed exceeds the first threshold, and the engine acceleration exceeds the desired engine acceleration threshold.

In one embodiment, a throttle lock is utilized to set a desired engine speed. For example, once an operator achieves a desired engine speed, he may select the throttle lock switch (not shown) which sends a signal to the controller 60. The controller 60 responds by storing the current engine speed, and maintaining the engine speed until the throttle lock is disengaged. The throttle lock may be disengaged by selecting the throttle lock switch again, or adjusting the throttle. In one embodiment, if a throttle lock has be activated, i.e., a desired engine speed has been established to maintain, when the compression brake is activated by the present invention, the throttle lock is kicked out. That is, the controller 60 lets the engine speed change, as opposed to attempting to maintain a set engine speed. When the engine speed has dropped below the desired threshold, and the compression brake is deactivated, the throttle lock is not automatically re-engaged. Instead, if the operator desires to re-establish a set engine speed to be maintained, the throttle lock switch must be reactivated. In an alternative embodiment, when the engine speed has dropped below the desired threshold and the compression brake is deactivated, the controller may try to return the engine speed to the previously set engine speed, assuming the set engine speed did not exceed the brake actuation speed. For example, the controller 60 may use the previous set engine speed as a desired engine speed, and gradually ramp the actual engine speed back up to the desired, or set engine speed.

Figure 6:
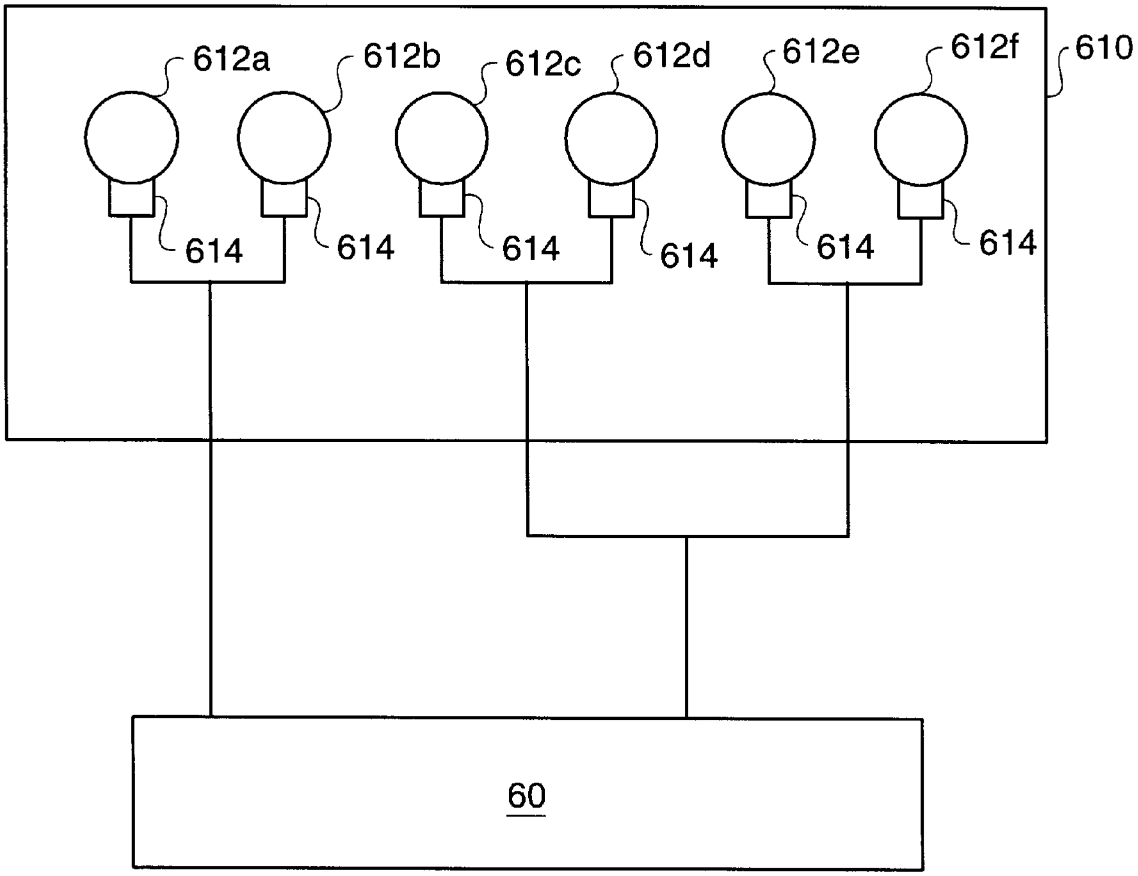
FIG. 6 illustrates a block diagram of an alternative embodiment of an engine having a compression release brake configuration.

FIG. 6 is a block diagram of an example of an alternative engine configuration. The engine 610 includes multiple cylinders having intake valves (not shown) and exhaust valves 612. The exhaust valves 612 may be electronically actuated to open and close. The engine 610 illustrates an example of a compression brake configured to operate the exhaust valves 612 in banks. For example, the exhaust valves 612*a* and 612*b* may be manipulated at the same time, and the exhaust valves 612*c–f* may be manipulated at the same time. At the desired time, the controller 60 would deliver a command signal, or pulse, to the actuators 614 associated with the exhaust valves 612*a*, 612*b*. The exhaust valves of 612*a* and 612*b* would essentially open for the duration of the pulse.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

INDUSTRIAL APPLICABILITY

In operation, the engine 10 of the present invention may be utilized to provide motive power to a machine such as an on-highway truck or an off-highway work machine. The engine 10 is operated in its drive mode of operation in order to advance the machine. When the engine 10 is operated in its drive mode of operation, the engine control module 60 operates the fuel injectors 46 such that fuel is injected into the engine cylinders so as to cause combustion within the engine cylinders.

When the engine 10 is operated in its drive mode of operation, the compression release brake assembly 64 is usually idled. However, during braking of the truck, such as downhill braking or the like, the operator of the truck (or the engine control module 60 itself) may switch the engine 10 into its brake mode of operation in order to assist the truck's main braking system in the slowing of the truck. When the engine 10 is being operated in its brake mode of operation, the engine control module 60 controls operation of the actuator assemblies 66 of the compression release brake assembly 64 such that the exhaust valves 42 are selectively opened in order to release compressed gas within the engine cylinders. Moreover, when the engine 10 is operated in its brake mode of operation, the fuel injection assembly 44 is idled.

One embodiment of the present invention includes a method and apparatus of controlling the speed of an engine, the engine having a plurality of cylinders, and a compression brake operable on one or more of the cylinders. The method includes the steps of determining a speed of the engine, comparing the engine speed to a first threshold, disabling fuel injection to each cylinder in response to the engine speed exceeding the first threshold, and activating the compression brake for at least one of the cylinders in response to the engine speed exceeding the first threshold. Once the engine speed drops below a second threshold then the compression brake may be deactivated and fuel injection may resume to the cylinders. When the engine speed exceeds the first threshold, an engine over-speed condition may be determined to be occurring, or likely to occur. In one embodiment of the present invention, engine acceleration may also be used to determine when an engine overspeed condition may exists, or be likely to occur.

The compression brake activation in response to an engine overspeed condition is preferably automatically generated in response to the engine speed exceeding a desired speed threshold, but may also be activated in response to an operator initiated command.

Other aspects, objects, and advantages of the present invention can be obtained from a study of the drawings, the disclosure, and the claims.

What is claimed is:

1. An apparatus configured to control the speed of an engine having a plurality of cylinders, the apparatus including a compression brake, operable on at least one cylinder of the engine, comprising:

a speed sensor adapted to sense an engine characteristic indicative of an engine speed and responsively generate an engine speed signal; and a controller configured to receive said engine speed signal, compare said engine speed to a first threshold, disable fuel injection to each cylinder in response to said engine speed exceeding said first threshold, and activate said compression brake for at least one of the cylinders in response said engine speed exceeding said first threshold.

2. An apparatus, as set forth in claim 1, wherein said controller is further configured to activate said compression brake for each of said cylinders in response to said engine speed exceeding said first threshold.

3. An apparatus, as set forth in claim 2, wherein said controller is further configured to determine a second engine speed in response to a subsequent speed signal, and deactivate said compression brake for at least one of the cylinders for which it has been activated when said second engine speed is less than a second speed threshold, said second speed threshold being less than said first speed threshold.

4. An apparatus, as set forth in claim 1, wherein said controller is further configured to receive an operator initiated signal, said signal being indicative of a desired engine braking, determine a second engine speed from a subsequent speed signal, and activate said compression brake in response to said operator signal and said second engine speed being greater than a second speed threshold, said second speed threshold being less than said first speed threshold.

5. A method of controlling the speed of an engine, the engine having a plurality of cylinders, and a compression brake operable on one or more of the cylinders, comprising the steps of:

determining a speed of the engine;

comparing said engine speed to a first threshold;

disabling fuel injection to each cylinder in response to said engine speed exceeding said first threshold; and activating said compression brake for at least one of said cylinders in response to said engine speed exceeding said first threshold.

6. A method, as set forth in claim 5, wherein the step of activating said compression brake, includes the step of activating said compression brake for each of said cylinders in response to said engine speed exceeding said first threshold.

7. A method, as set forth in claim 6, further including the steps of:

determining a second engine speed;

deactivating said compression brake for at least one of the cylinders for which it has been activated when said second engine speed is less than a second speed threshold, said second speed threshold being less than said first speed threshold.

8. A method, as set forth in claim 5, further including the steps of:

detecting an operator initiated signal, said signal being indicative of a desired engine braking;

determining a second engine speed;

activating said compression brake in response to said operator signal and said second engine speed being greater than a second speed threshold, said second speed threshold being less than said first speed threshold.

9. A method, as set forth in claim 8, further including the steps of:

determining a third engine speed;

deactivating said compression brake in response to said third engine speed being less than a third engine threshold, said third engine threshold being less than said second engine threshold.

10. A method, as set forth in claim 5, further including the steps of:

determining an acceleration of the engine;

determining if the current engine acceleration exceeds a desired acceleration threshold; and activating said compression brake in response to said engine speed exceeding said first threshold, and said acceleration exceeding said desired acceleration threshold.

11. A method, as set forth in claim 5, further including the steps of:

comparing said engine speed with a second threshold, said second threshold being less than said first threshold;

determining an acceleration of the engine;

comparing said engine acceleration with a desired acceleration threshold; and activating said compression brake in response to said engine speed exceeding said second threshold and said acceleration exceeding said desired acceleration threshold.

* * * * *